(12) United States Patent
Caldwell et al.

(10) Patent No.: US 7,926,779 B2
(45) Date of Patent: Apr. 19, 2011

(54) PUMP BRACKET 90° MOUNTING

(75) Inventors: Gerard Keith Caldwell, Corona, CA (US); Jimmie Lewis Jackson, Jr., Lago Vista, TX (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 666 days.

(21) Appl. No.: 11/903,519

(22) Filed: Sep. 21, 2007

(65) Prior Publication Data

US 2009/0078848 A1    Mar. 26, 2009

(51) Int. Cl.
*F16M 13/00* (2006.01)
(52) U.S. Cl. ........................................ 248/612; 248/637
(58) Field of Classification Search .................. 248/612, 248/637, 674, 300, 316.1
See application file for complete search history.

(56) References Cited

U.S. PATENT DOCUMENTS

| 4,601,378 | A | * | 7/1986 | Pierce et al. | 192/115 |
|---|---|---|---|---|---|
| 4,900,224 | A | | 2/1990 | Timperi et al. | |
| 5,092,711 | A | * | 3/1992 | Langner | 405/169 |
| 5,529,462 | A | | 6/1996 | Hawes | |
| 5,791,522 | A | | 8/1998 | Lee et al. | |
| 7,021,599 | B2 | | 4/2006 | DeGrazia et al. | |
| 2005/0252934 | A1 | | 11/2005 | Millet et al. | |
| 2006/0237480 | A1 | | 10/2006 | Miller et al. | |
| 2008/0142674 | A1 | * | 6/2008 | Dang et al. | 248/674 |

* cited by examiner

*Primary Examiner* — Terrell Mckinnon
*Assistant Examiner* — Erin Smith

(57) ABSTRACT

A new and unique L-shaped bracket for mounting a pump is provided, featuring a rear bracket member having a rear cavity portion for receiving and supporting one end of the pump; and a bracket support perpendicularly extending from the rear bracket member, having one or more retaining clips for frictionally engaging and coupling to the other end of the pump.

11 Claims, 3 Drawing Sheets

PUMP BRACKET 90° MOUNTING

BACKGROUND OF THE INVENTION

1. Technical Field

The present invention relates to a pump bracket; and more particularly to a method and apparatus for providing a pump bracket with 90° mounting.

2. Description of Related Art

In the beverage industry, many different applications call for multiple pumps mounted on a slide track. Current individual slide brackets mount a pump parallel to the slide track creating a wide footprint or profile, typically limiting the assembly to 3 pumps per track on a 17 inch rack. Pumps are retained to the bracket along the side of the pump with no retention along the top or bottom of pump.

One problem with this prior art design is that having such a wide mounting profile limits the number of pumps per slide track. Mounting pumps on the side like this also makes the plumbing of gas lines difficult because the plumbing must be woven rather than a straight line of plumbing. More material must also be used to accommodate the volume needed.

Because of this, there is a need in the industry for a better way to mount such pumps on such a slide track.

SUMMARY OF THE INVENTION

The present invention provides a new and unique method and apparatus for mounting such a pump on such a slide track. The apparatus takes the form of an L-shaped bracket featuring a rear bracket member having a rear cavity portion for receiving and supporting one end of the pump; and a bracket support perpendicularly extending from the rear bracket member, having one or more retaining clips for frictionally engaging and coupling to the other end of the pump.

The rear cavity portion may include one or more walls having one or more retaining clips for coupling to the one end of the pump, as well as two parallel side or back support columns for coupling to the one end of the pump to prevent twisting of the pump. In one embodiment, the rear cavity portion receives and supports an end cap arranged on the one end of the pump, and the one or more retaining clips frictionally engages and couples to another end cap arranged on the other end of the pump.

The rear bracket member may include one or more tear drop holes use for optional mounting for coupling the L-shaped bracket in place with suitable fasteners, if needed The one or more retaining clips may include two back retaining clips for frictionally engaging and coupling to the one end of the pump, and also includes two front retaining clips for frictionally engaging and coupling to the other end of the pump. The one or more retaining clips may be flexible members.

The L-shaped bracket may take the form of an integrally molded plastic piece.

The pump may be mounted on its longitudinal front-to-back axis, and can be mounted in either orientation in relation to this axis.

The method features steps of receiving and supporting the one end of the pump with the rear cavity portion of the rear bracket member of the L-shaped bracket; and frictionally engaging and coupling the other end of the pump with the one or more retaining clips of the top bracket support that perpendicularly extends from the rear bracket member.

In effect, the bracket according to the present invention will allow pumps to mount perpendicular to the slide track mount surface creating a much narrower overall profile so as to increase the amount of pumps per slide track. The perpendicular mounting of the pumps also makes the plumbing of gas lines much easier because the plumbing does not have to be woven and instead a straight line of plumbing can be easily adapted. Less material may also be used to accommodate the reduced volume needed.

Possible applications include, but are not limited to, use in the beverage industries on bag in box storage racks. Wherever the air operated pump is used, this bracket can be utilized, be it industrial, agriculture, car wash etc. . . .

BRIEF DESCRIPTION OF THE DRAWING

The drawing includes the following Figures, which are not necessarily drawn to scale:

FIGS. 1a and 1b, show perspective views of an L-shaped bracket for mounting a pump according to some embodiments of the present invention.

FIGS. 3a and 3b, shows perspective views of the L-shaped bracket shown in FIG. 1 arranged in relation to a pump according to some embodiments of the present invention.

FIGS. 4a and 4b, shows perspective views of the L-shaped bracket shown in FIG. 1 arranged in relation to a pump according to some embodiments of the present invention.

BEST MODE FOR CARRYING OUT THE INVENTION

Figure 1:
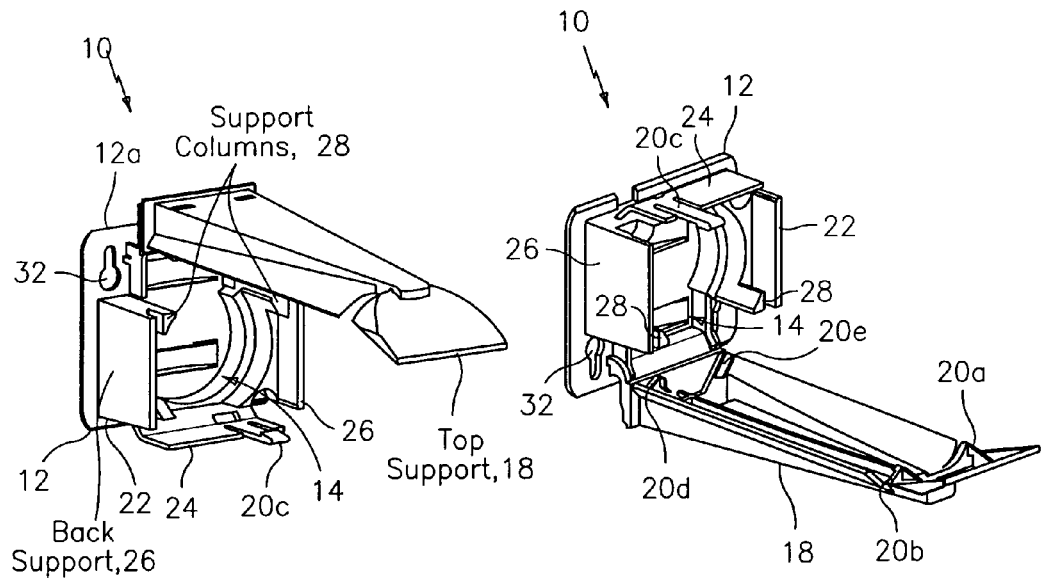
FIG. 1, including
Figure 2:
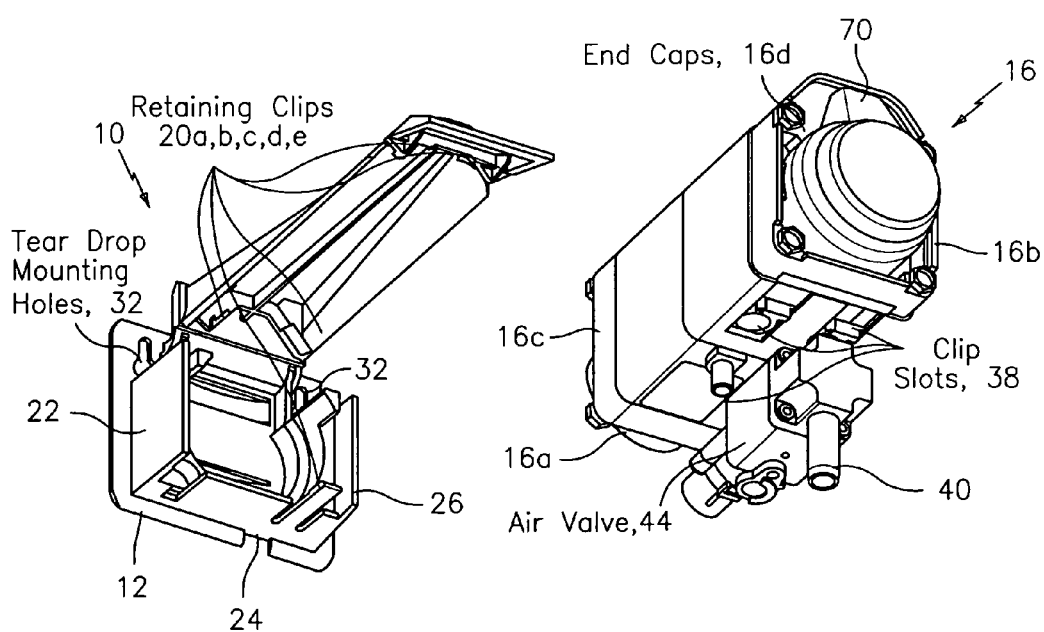
FIG. 2 shows perspective views of the L-shaped bracket shown in FIG. 1 arranged in relation to a pump according to some embodiments of the present invention.
Figure 3:
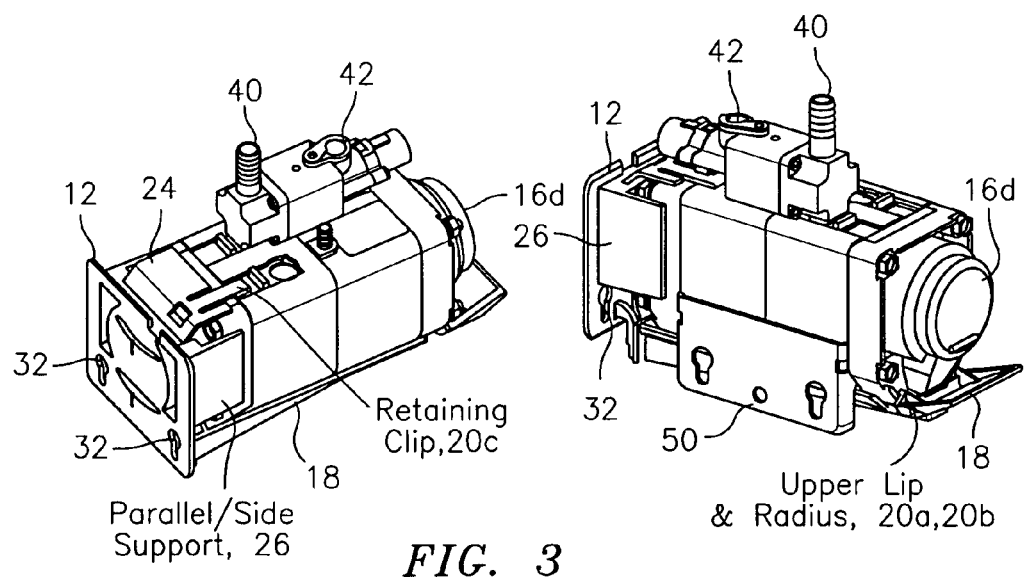
FIG. 3, including
Figure 4:
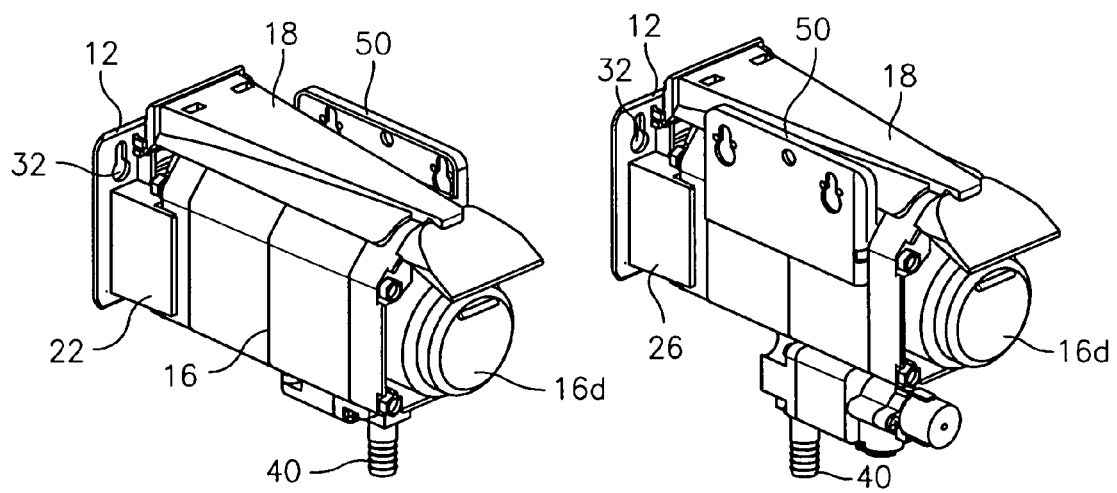
FIG. 4, including

FIGS. 1-5 show, by way of example, a new and unique method and apparatus for mounting a pump with 90° mounting. The apparatus is shown as an L-shaped bracket generally indicated as 10. The L-shaped bracket 10 features a rear bracket member 12 having a rear cavity portion 14 for receiving and supporting one end 16a of the pump 16 (see FIG. 2); and a bracket support 18 perpendicularly extending from the rear bracket member 12, having one or more retaining clips 20a and 20b (see FIG. 2) for frictionally engaging and coupling to the other end 16b of the pump 16. Although the invention is shown and described herein by way of example in relation to a particular pump that is known in the art, the scope of the invention is not intended to be limited to only this known pump. For instance, embodiments are envisioned for using the L-shaped bracket for mounting other types and kinds of pumps either now known or later developed in the future.

According to the present invention, the rear cavity portion 14 of the L-shaped bracket 10 may include one or more walls, columns or supports 22, 24, 26 for receiving and supporting the pump 16. For example, the wall 24 may include one or more retaining clips 20c for coupling to the lower part of the one end 16a of the pump 16. In addition, the two parallel walls or sides 22, 26 or back support columns 28 may be used for coupling to the one end 16a of the pump 16 to prevent twisting of the pump 16. In operation, the rear cavity portion 14 receives and supports an end cap 16c arranged on the one end 16a of the pump 16, and the one or more retaining clips 20a, 20b frictionally engages and couples to another end cap 16d on the other end 16b of the pump 16. The scope of the invention is not intended to be limited to pumps having end caps such as elements 16c and 16d; embodiments are envisioned using the invention in relation to pumps having end caps as well as pumps not having end caps that are now known or later to be developed in the future.

The bracket support 18 of the L-shaped bracket 10 may also include one or more retaining clips 20d and 20e for frictionally engaging and coupling to the other end 16b of the pump 16. The invention is described herein having five retaining clips identified as 20a, 20b, 20c, 20d, 20e. However, the scope of the invention is not intended to be limited to the number, type, kind, configuration or dimensionality of such retaining clips forming part of the bracket support 18 disclosed herein. For example, the scope of the invention is intended to include a different number, type, kind, configuration or dimensionality of the retaining clips forming part of the bracket support 18 disclosed herein, including retaining clips both now known or later developed in the future.

The rear bracket member 12 of the L-shaped bracket 10 may also include a mounting portion 12a having one or more tear drop holes 32 for coupling the of the L-shaped bracket 10 to a slide track 34 (see FIG. 5) with suitable fasteners (not shown).

In the best mode of the invention as shown herein, the pump 16 is mounted into the rear cavity portion 14 along the end cap 16c, and retained along the top with the four retaining clips 20a, 20b, 20d, 20e molded into the top support 18 in which they capture an upper lip 70 and radius of the pump end caps 16c, 16d. Retention to rear bracket member 12 is accomplished by the additional retaining clip 20c along the bottom wall 24, which clips behind the end cap 16c into a suitable cavity created by the clip slots 38 currently on the known pump 16, as shown. An additional support is provided by two corresponding support columns 28, mating to the end caps existing cavities as well as two parallel side supports 22 and 26 to prevent twisting. One or more tear drop mounting holes 32 are dimensioned to fit existing mounting dimensions on various preexisting installations known in the art so as to allow for a retro-fitting for the new L-shaped bracket 10 disclosed herein. The bracket and pump arrangement according to the present invention can be mounted in various locations where wall space is limited.

The new L-shaped bracket 10 allows the pump 16 to be mounted in either direction of the end caps with product ports 40, 42 in the front of or behind an air valve 44. Orientation of product ports 40, 42 and the air valve 44 to adjacent pumps allows for a simpler installation of gas lines without having to weave tubing from one pump to another.

Pumps can be mounted on the bracket prior to installation on the beverage pump rack or can be installed pre-mounted as well.

Figure 5:
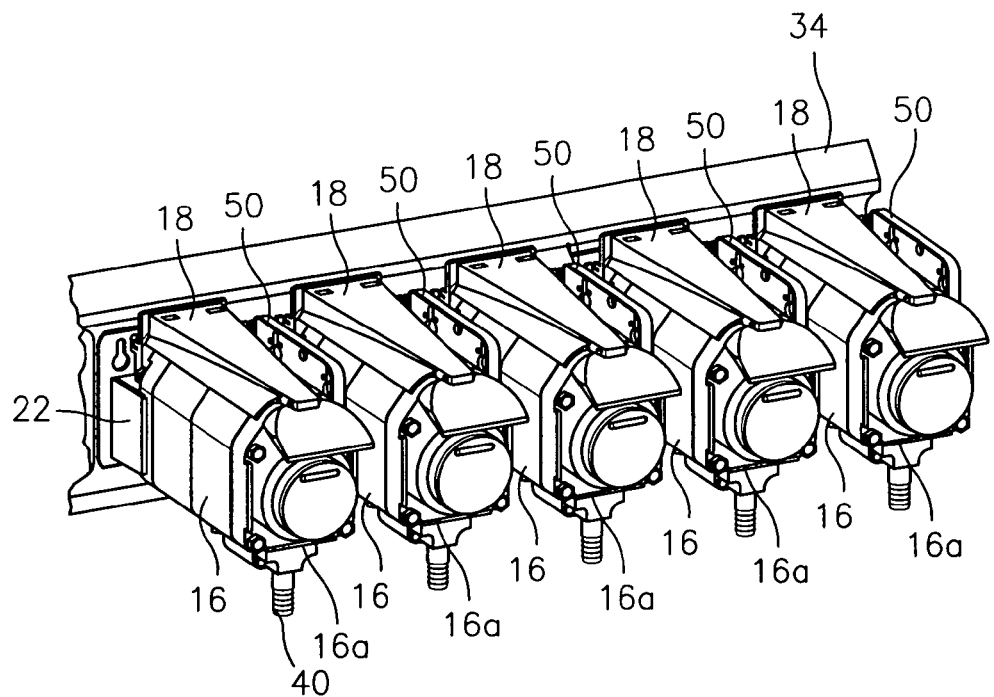
FIG. 5 shows a perspective view of a group of L-shaped bracket shown in FIG. 1 having pumps therein and arranged on a slide track according to some embodiments of the present invention.
Figure 6:
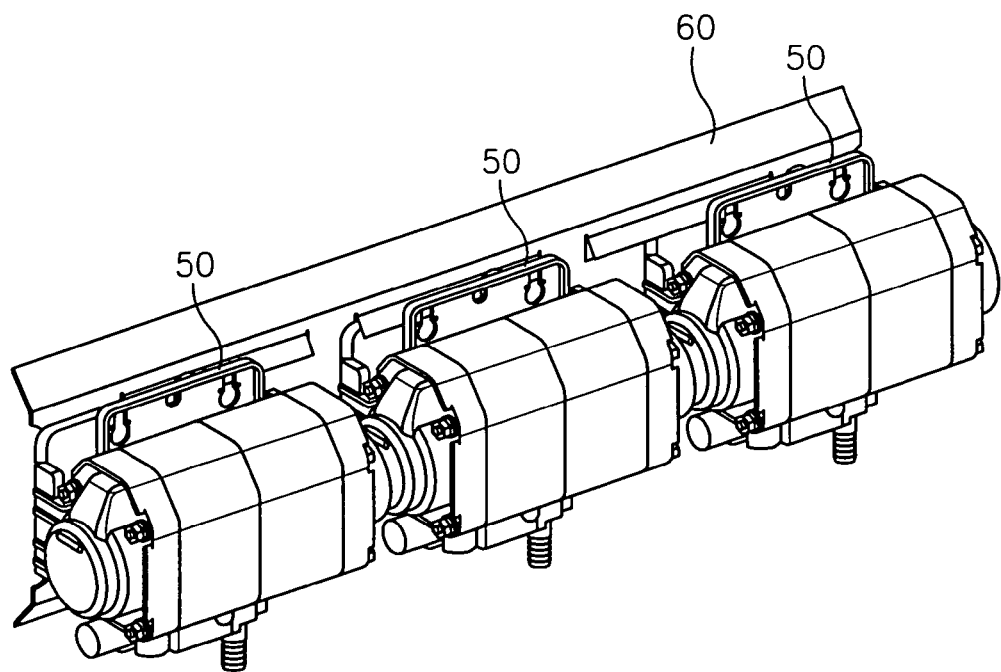
FIG. 6 shows a perspective view of a group of flat bracket having pumps therein and arranged on a slide track that is known in the art.

With a narrow side-by-side profile as best shown in FIG. 5, this allows for about 66% growth of pump usage in same space. In contrast, the known slide bracket 50 typically allows only 3 side-by-side pumps on the typical 17" wide inch rack, as best shown by way of comparison in FIG. 6. In addition, on a 32" inch wide rack, this configuration would allow for approximately 20 pumps if so needed, depending on the application.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

The invention claimed is:

1. An L-shaped bracket for mounting a pump having a longitudinal front-to-back axis and end caps in relation to a mounting surface of a slide track, comprising:
    a rear bracket member having a rear cavity portion with walls, columns or supports configured to receive and support one end cap arranged on one end of the pump and to prevent twisting of the pump; and
    a bracket support perpendicularly extending on one end from a mounting or upper portion of the rear bracket member, and having another end with one or more retaining clips configured to frictionally engage and couple to another end cap arranged on the other end of the pump for mounting the pump along its longitudinal front-to-back axis with a 90° mounting,
    whereby the L-shaped bracket is configured to allow the pump to be mounted perpendicular to the mount surface of the slide track creating a much narrower overall profile so as to increase the amount of pumps per slide track, such that the perpendicular mounting of the pump also makes the plumbing of gas lines easier because the plumbing does not have to be woven and instead a straight line of plumbing can be easily adapted.

2. An L-shaped bracket according to claim 1, wherein at least one wall has at least one retaining clip configured to couple to the one end cap arranged on the one end of the pump.

3. An L-shaped bracket according to claim 1, wherein the mounting or upper portion has one or more tear drop holes configured to couple to the mounting surface of the slide track with suitable fasteners.

4. An L-shaped bracket according to claim 1, wherein the walls, columns or supports comprise two parallel side or back support columns configured to couple to the one end cap arranged on the one end of the pump to prevent twisting of the pump.

5. An L-shaped bracket according to claim 1, wherein the bracket support further comprises two back retaining clips configured to frictionally engage and couple to the one end cap arranged on the one end of the pump being received and supported by the rear cavity portion.

6. An L-shaped bracket according to claim 1, wherein the L-shaped bracket is an integrally molded plastic piece.

7. An L-shaped bracket according to claim 1, wherein the one or more retaining clips are flexible members.

8. An L-shaped bracket according to claim 1, wherein the rear bracket member and bracket support are configured so that the pump can be mounted in either orientation in relation to this axis.

9. An L-shaped bracket according to claim 1, wherein the walls, columns or supports comprise a bottom wall extending from a lower portion of the rear bracket member having at least one retaining clip configured to couple to a lower part of the one end cap arranged on the one end of the pump being received and supported by the rear cavity portion.

10. An L-shaped bracket according to claim 1,
    wherein the walls, columns or supports comprise two parallel side or back support columns configured to couple to the one end cap arranged on the one end of the pump to prevent twisting of the pump; and wherein the bracket support further comprises two back retaining clips configured to frictionally engage and couple to the one end cap arranged on the one end of the pump being received and supported by the rear cavity portion.

11. An L-shaped bracket according to claim 1, wherein the walls, columns or supports comprise two parallel side or back support columns configured to couple to the one end cap arranged on the one end of the pump to prevent twisting of the pump;

wherein the bracket support further comprises two back retaining clips configured to frictionally engage and couple to the one end cap arranged on the one end of the pump being received and supported by the rear cavity portion; and wherein the walls, columns or supports comprise a bottom wall extending from a lower portion of the rear bracket member having at least one retaining clip configured to couple to a lower part of the one end cap arranged on the one end of the pump being received and supported by the rear cavity portion.

* * * * *